May 15, 1945.   J. A. ANANIA   2,375,882
ADJUSTABLE TOOL HOLDER
Filed Oct. 11, 1943
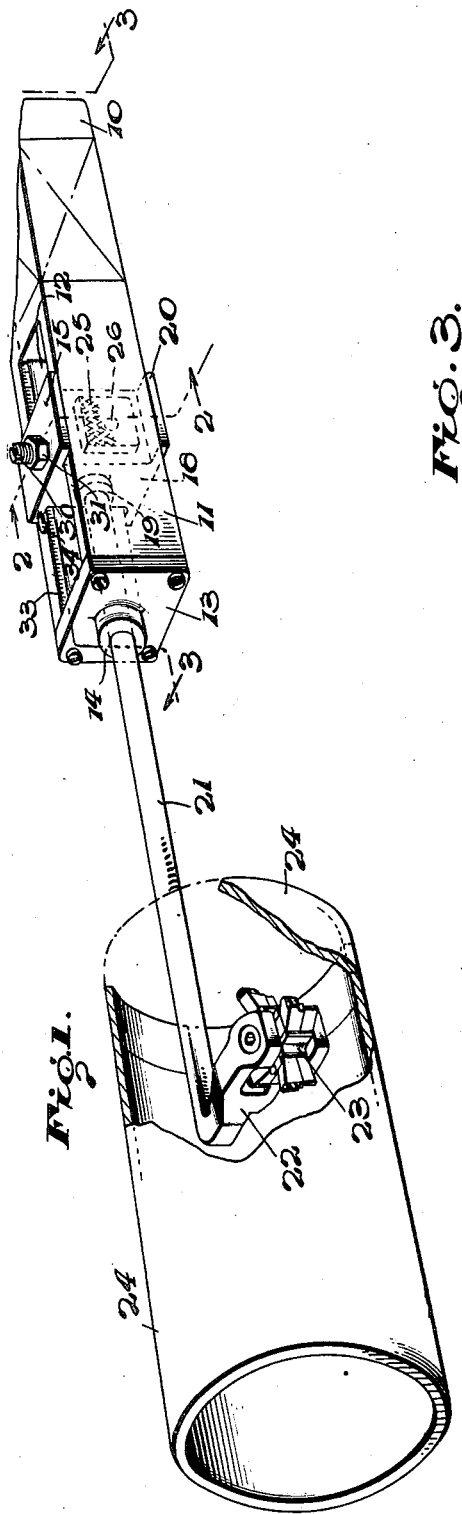
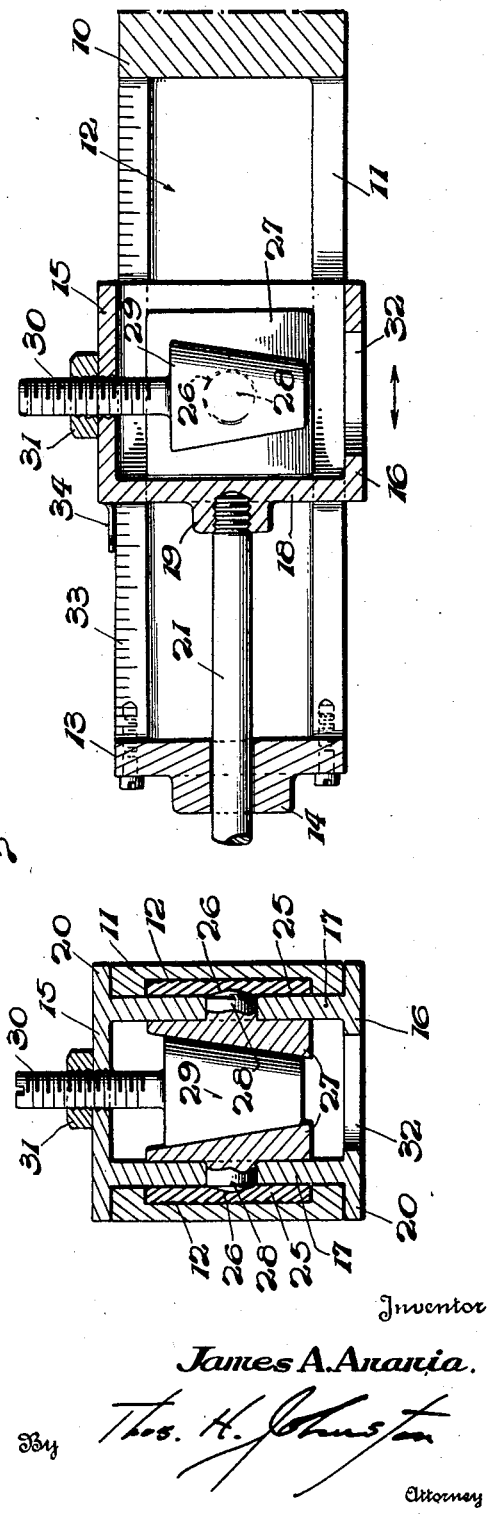
Inventor
James A. Anania.
By Thos. H. Johnston
Attorney Patented May 15, 1945

2,375,882

UNITED STATES PATENT OFFICE 2,375,882

ADJUSTABLE TOOLHOLDER

James A. Anania, Newark, N. J.

Application October 11, 1943, Serial No. 505,860

7 Claims. (Cl. 287—53)

This invention relates to an improved tool holder for machine tools.

Heretofore, considerable difficulty has been experienced in boring operations by reason of the fact that the tool holder often proves too short with the result that the work being bored strikes the tool post of the machine to block completion of the work.

It is therefore an object of the present invention to provide a tool holder which may be adjustably elongated, thus particularly adapting the holder for deep boring operations.

A further object of the invention is to provide a tool holder wherein the lineal adjustment thereof will be firm and stationary so that the adjustment of the holder in the tool post may not be rendered ineffective by variation in the effective length of the holder.

And the invention seeks, as a still further object, to provide a tool holder embodying a shank adjustably receivable by a tool post, a crosshead adjustable upon the shank, a tool stem carried by the crosshead, and wedge operated means for locking the crosshead stationary on the shank.

Other and incidental objects of the invention will appear during the course of the following description, and in the drawing, Figure 1 is a perspective view of my improved tool holder.

Figure 2 is an enlarged transverse vertical section on the line 2—2 of Figure 1.

Figure 3 is an enlarged horizontal section on the line 3—3 of Figure 1.

In carrying the invention into effect, I employ a shank 10, rectangular in cross section to be adjustably received in the usual tool post, as will be well understood. The shank may, of course, be of any approved length and at its forward end portion is cut away to provide parallel side bars 11 in which are formed longitudinal channels 12. Rigidly connecting the side bars at their forward ends is a detachable end plate 13 preferably provided at its forward side with a boss 14.

Slidable between the side bars 11 of the shank 10 is a box-shaped crosshead comprising top and bottom walls 15 and 16 respectively, side walls 17, and a front wall 18 having a boss 19 thereon, the crosshead being open at the rear thereof. The side walls 17 slidably fit between the bars 11 and projecting from the top and bottom walls 15 and 16 are flanges 20 which overlap the longitudinal edges of the bars to slidably support the crosshead thereon.

Slidable through the end plate 13 and through the boss 14 is a stem 21 screwed at its rear end into the boss 19 of the end wall 18 of the crosshead and provided with an angularly disposed fork 22 carrying a rotatably adjustable cutter head indicated as a whole at 23. As the structural details of the parts 22 and 23 have been amply set forth in my copending application for cutter tool assemblies filed of even date herewith, it is unnecessary to describe said parts herein. Suffice it to say that the head 23 comprises a number of cutters and is rotatably adjustable upon the fork to selectively dispose said cutters in working position. In Figure 1, I have shown a conventional cylinder 24 with the head 23 disposed therein in position for work on the cylinder.

Slidably fitting in the channels 12 of the side bars 11 of the shank 10 are friction shoes 25, the outer faces of which are preferably knurled to coact with the bottom walls of said channels, and formed in the inner sides of said shoes are sockets 26. Mounted within the crosshead of the shank are opposed wedge-blocks 27 having studs 28 slidably received through the side walls 17 of the crosshead and engaging in said sockets. As the crosshead is shifted longitudinally of the bars 11, the studs 28 will, of course, drag the shoes with the crosshead.

Disposed between the wedge-blocks 27 to coact therewith is a truncated cone-shaped wedge 29 having a stem 30 screwed through the top wall 15 of the crosshead and provided with a lock nut 31. Formed in the bottom wall 16 of the crosshead is an opening 32 through which the wedge may be arranged in position and, in this connection, it may be noted that the shoes 25 are first installed, when the wedge 29 is disposed in position and adjusted to its upward limit. Clearance will thus be provided for the installation of the wedge-blocks 27 which are then disposed at opposite sides of the wedge and the studs 28 inserted through the side walls 17 of the crosshead to engage in the sockets 26 of the shoes. Normally, the wedge 29 will, of course, be adjusted downwardly somewhat to prevent displacement of the wedge-blocks and, as seen in Figure 3, the forward edges of said blocks are disposed to coact with the front wall 18 of the crosshead to prevent rotation of said blocks about the axes of the studs 28 as the wedge is rotatably adjusted.

As will now be seen, the wedge 29 may be adjusted upwardly to relieve pressure on the wedge-blocks 27 and accordingly on the shoes 25, when the crosshead may be shifted along the side bars 11 of the shank 10 for varying the effective length of the tool holder, as may be desired.

Subsequent downward adjustment of the wedge will then serve to exert lateral pressure on the blocks 27 with the result that the shoes 25 will be forced into engagement with the bottom walls of the channels 12 for firmly locking the crosshead stationary. Movement of the stem 21 will thus be prevented so that the functioning cutter of the head 23 may accomplish accurate work. Preferably, the upper inside margin of one of the side bars 11 of the shank 10 is provided with calibrations, as indicated at 33, while the crosshead is equipped with a coacting finder 34 so that the crosshead may be accurately adjusted either forwardly or rearwardly any given distance desired.

Having thus described my invention, what I claim is:

1. A machine tool holder including a shank for engagement in a tool post and provided with side bars, a crosshead slidable between said bars, a tool carrying stem fixed to the crosshead, the crosshead being adjustable for shifting the stem and varying the effective length of the holder, shoes mounted to coact with said bars, wedge-blocks carried by the crosshead and movable to spread the shoes apart, and a wedge adjustable upon the crosshead to spread the blocks and force the shoes into engagement with said bars for locking the crosshead in adjusted position.

2. A machine tool holder including a shank for engagement in a tool post and provided with side bars having channels therein, a crosshead slidable between said bars, a tool carrying stem fixed to the crosshead, the crosshead being adjustable for shifting the stem and varying the effective length of the holder, shoes slidable in said channels to coact with said bars, opposed wedge-blocks carried by the crosshead and having studs engaging said shoes, and a conical wedge mounted upon the crosshead between said blocks to coact therewith and adjustable for spreading the blocks and forcing the shoes into engagement with said bars to lock the crosshead in adjusted position.

3. A machine tool holder including a shank for engagement in a tool post and provided with side bars, a crosshead slidable between said bars and having top and bottom walls, a front wall, and side walls slidably fitting between said bars, the top and bottom walls being provided with flanges overlapping the longitudinal edges of the bars to support the crosshead thereon, a tool carrying stem fixed to the front wall of the crosshead, the crosshead being adjustable for shifting the stem and varying the effective length of the holder, shoes mounted to coact with the side bars, opposed wedge-blocks carried by said side walls and having studs slidably received through said side walls to engage said shoes, and a conical wedge rotatably adjustable upon said top wall between said blocks for spreading the blocks and forcing the shoes into engagement with said bars to lock the crosshead in adjusted position.

4. A machine tool holder including a shank having spaced portions, a crosshead slidably adjustable between said portions of the shank, opposed wedge blocks mounted on the crosshead and having means to operatively engage said portions of the shank, and a wedge adjustable upon the crosshead between said blocks for spreading the blocks apart and binding said means in engagement with said portions of the shank to lock the crosshead stationary.

5. A machine tool holder including a shank having spaced side bars, a crosshead slidably adjustable between said bars, wedge blocks carried by the crosshead, means operable by said blocks to engage the side bars, and a conical wedge rotatably adjustable on the crosshead between said blocks for spreading the blocks apart and binding said means in engagement with the side bars to lock the crosshead stationary.

6. A machine tool holder including a shank having spaced side bars, shoes slidable thereon, a crosshead slidably adjustable between said bars, wedge blocks mounted on the crosshead, means separably connecting the shoes with the blocks for sliding movement with the crosshead and disposed to transmit spreading movement of the blocks to the shoes, and a wedge adjustable upon the crosshead between the blocks for spreading the blocks apart and binding said shoes in engagement with the side bars to lock the crosshead stationary.

7. A machine tool holder including a shank having spaced side bars having channels therein, shoes slidable in said channels, a crosshead slidably adjustable between said bars and confining the shoes in said channels, wedge blocks mounted on the crosshead and operatively connected with said shoes, and a wedge adjustable upon the crosshead between the blocks for spreading the blocks apart and binding said shoes in engagement with the side bars to lock the crosshead stationary.

JAMES A. ANANIA.